Oct. 20, 1953          J. E. WOODS          2,656,114
SYSTEM FOR CONTROLLING FLOW OF CIRCULATING LIQUID
Filed Aug. 9, 1950
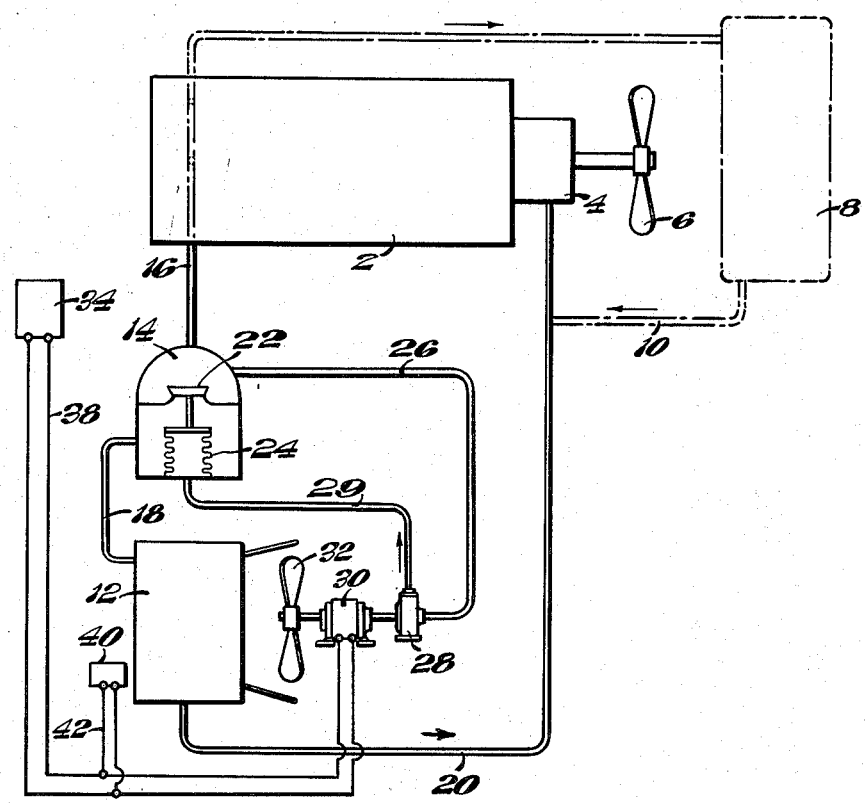
Inventor.
John E. Woods.
By Kenway Jenney Witter
& Hildreth
Attys.

Patented Oct. 20, 1953

2,656,114

UNITED STATES PATENT OFFICE 2,656,114

SYSTEM FOR CONTROLLING FLOW OF CIRCULATING LIQUID

John E. Woods, Cohasset, Mass., assignor to Standard-Thomson Corporation, Boston, Mass., a corporation of Delaware Application August 9, 1950, Serial No. 178,457

3 Claims. (Cl. 237—8)

The present invention relates to systems for controlling the flow of circulating liquid, and has for its object to provide a simple and inexpensive flow control system, which is especially suitable for, but not limited to, the control of heaters for automotive vehicles.

The usual automobile heater comprises a radiator which may be supplied with hot water from the circulating system of the engine. The heater has a thermostatically controlled valve which modulates the flow of hot water from the engine into the heater. The heater usually has a fan to drive air over the heater, the air being supplied either through the cooling radiator or through the cowl. This system is complicated and expensive since the control for the valve requires a bellows operated by a bulb in the body of the car, which is connected by a capillary with the bellows, or if equipped with a bellows without the capillary, necessitates the control valve being placed in such a position that it will in itself respond to the temperature of the car body which is to be controlled. An additional expensive means of adjustment is required if the valve is located outside the car body, while if it is located inside the car body the hot water from the engine jacket must be carried to the valve and then back again to the engine cooling radiator or circulating pump. The thermostatic assembly must be of sufficient power to close the valve against the water pressure.

With the above and other objects in view, as will hereinafter appear, the principal feature of the invention comprises a normally balanced valve in the circulating system, the valve being connected with an expansible sealed device (such as a bellows or diaphragm) which is normally filled with the circulating medium through a branch line, in combination with a pump for forcing some of the circulating medium into the bellows to expand it and thus to unbalance the valve. Since the pump is required to supply only an unbalance of pressure and is not called on to move any substantial quantity of liquid, it may be of very small size. The system is applicable to any control for circulating liquid, as for unit heaters and the like, and is especially useful in automotive heaters, in which case the motor for driving the fan may be used for the pump.

Another feature of the invention, which is particularly useful for automotive heating, comprises an arrangement to cause intermittent operation of the heater, irrespective of the main temperature control, in order to prevent uncomfortable drafts.

The accompanying drawing is a diagram illustrating what is now considered the preferred form of the invention as applied to an automotive heater.

The engine is shown at 2, the water pump at 4 and the radiator fan at 6. The water circulation system for engine cooling is indicated by the radiator 8 and the lines 10 which parts are shown in dot-and-dash lines since they form no part of the present invention. Water is also circulated from the engine jacket by the pump 4 through a heater radiator 12 and a valve 14. To this end a line 16 connects from the engine jacket to the inlet of the valve 14, a line 18 between the valve outlet and the heater 12, and a line 20 between the heater and the pump 4. The valve 14 comprises a body enclosing a poppet valve 22 adapted to be actuated by a suitable closed expansible member, shown as a bellows 24 in the outlet portion of the body. A branch line 26 connects the inlet side of the valve with the inlet of a small centrifugal pump 28 and the outlet of the pump is connected to the interior of the bellows 24 through a line 29. The bellows 24 is always filled with water. When the pump is not operating, the valve is under a substantially balanced pressure since the effective area of the bellows is preferably about equal to the area of the valve seat. The bellows is extended to slightly more than its normal free length when the valve is closed, so that the contraction of the bellows holds the valve against its seat. (Or the bellows may be set at substantially its free length when the valve is closed, in which case a light spring is used to hold the valve seated.) If desired the area of the valve 22 may be slightly greater than that of the bellows, whereby a positive seating force is attained. In any event, both the valve 22 and the interior of the bellows are subjected to the same pressure of the circulating liquid. When the pump is driven, however, the pump pressure overcomes the balanced pressure and expands the bellows, thereby lifting the valve from its seat and permitting the water to flow through the heater.

The pump is driven by a small electric motor 30 which also preferably drives the small fan 32 for directing heated air through the heater 12 into the interior of the vehicle. A thermostatic switch 34, which may be of any suitable construction, is connected by wires 38 with the motor 30. The switch may be an on-and-off switch whereby the motor will be started when there is a demand for heat and shut off when no heat is called for, or it may be a modulating type of switch whereby the speed of the motor may be varied in accordance with the temperature in the vehicle. In the latter case, the valve 22 will be opened and closed by varying amounts and the fan 32 will be driven at a variable speed depending on the amount of heat called for by the car. It will be observed that the thermostat may be placed in any suitable position in the car and that the wire connections 38 may be readily run from such position to the motor. This obviates the necessity of running a capillary from the control point to the valve or running plumbing lines to bring the water up to the valve, or the use of an expensive remote control system for adjustment, as is required in any of the conventional systems.

It may be noted that in the event of accidental puncture of the bellows, the valve will close, but some flow of water will take place through the branch lines 26 and 29 and through the puncture itself, so that standby operation of the heater will be maintained.

For automotive operation, it is desirable to prevent drafts of cold air, when the car body is at a temperature sufficient to cut off water flow through the heater. To this end a second thermostatic switch 40 is placed at the outlet of the heater and is connected by wires 42 with the wires 38 that lead to the motor. This arrangement is especially useful when the switch 34 is of the on-or-off type. Thus the motor will be driven whether the switch 34 or the switch 40 is closed. An example of the operation is as follows: Suppose the atmospheric temperature to be in the range of 50-60° F. If the thermostatic control 34 in the car body is set for 70°, the differential between outside temperature and car temperature is so small that operation of the heater will not be frequently called for by the thermostatic switch 34, once the car has been brought to 70°. Since a considerable volume of fresh air is continuously directed into the car, around the feet of the front seat occupants, it would tend to cause discomfort since its temperature would be 10° to 20° below the prevailing temperature. However, the switch 40 detects this relatively cool air in the immediate vicinity of the heater outlet and opens the valve 22 to apply some heat to the air. As soon as the air has come up to the cut-off temperature of the switch 40 (which may be set for a somewhat higher temperature than the switch 34, for example 80°-85°), the motor is stopped and the valve closes. Until either switch 34 or switch 40 closes again, the incoming air will be tempered by the heated surfaces of the heater and the warm water remaining in the heater unit itself. The result of this operation is therefore a tempering of the incoming air to hold it within the so-called "comfort zone," that is, not lower than about 80° or 85° F., and not higher than approximately 95° F., and in such a manner that neither the temperature nor its slight variation is noticeable to the passenger, and without sufficient heat content to override or affect the temperature setting of the car body control 34.

The switch 40 is in readiness to prevent cold drafts at all times, but will usually come into play only when the outside temperature is in a rather restricted range, since in colder weather the control 34 calls for a sufficiently continuous operation to insure against cold drafts.

An important feature of the invention particularly useful for automotive heating is that the control valve and the small centrifugal pump which operates it are included in one assembly with the car heater motor and fan assembly. Accordingly, most of the plumbing to bring the hot water up to the control valve in the car body is eliminated, and in addition a small electric-type thermostat can be placed at any position in the car body, since it is only connected by two wires to the actual operating point in the engine compartment.

Another feature of the invention is that the pump 28 may be used to operate any additional bellows or diaphragms for control of other equipment, as for example, air dampers or shutters, since adequate force for operation of such other equipment is readily attained with a pump of moderate size.

While the invention has been described as applied to an automotive heater, its application is not thus limited, since it may be used for individual radiator controls, unit heaters, etc. as well as in any liquid-circulating system. The invention is not limited to the particular embodiment shown and described but may be varied in many respects as will be clear to those skilled in the art.

Having thus described the invention, I claim:

1. A control for a circulating-liquid system comprising a valve body in the system having an inlet and an outlet, a valve member in the body, a closed expansible member in the valve body at the outlet side of the valve member, an operating connection between the expansible member and the valve member, a branch line leading from the inlet side of the valve member to the interior of the expansible member to maintain said expansible member filled with circulating-liquid medium, the valve member being thereby subjected to substantially balanced pressure, and a pump in the branch line to force additional liquid medium into the expansible member to expand it and to operate the valve member.

2. The combination with a circulating-liquid heater of a valve body having an inlet and an outlet, a valve member in the body, the valve being arranged to pass or cut off flow of liquid to the heater, a closed expansible member at the outlet side of the valve member and filled with the circulating-liquid medium and connected with the valve member, the valve member being thereby subjected to substantially balanced pressure, a pump to force additional liquid medium into the expansible member to expand it and to operate the valve member, thermostatic means in the space to be heated to control operation of the pump, and additional thermostatic means responsive to the temperature of air at the heater outlet to cause operation of the pump when said air temperature drops below a predetermined value, irrespective of the operation of said first-named thermostatic means.

3. A control system for an automotive heater having a fan and driving motor therefor, said control system comprising a valve body having an inlet and an outlet, a valve member in the body, the valve being arranged to pass or cut off flow of liquid to the heater, a closed expansible member at the outlet side of the valve member and filled with the circulating-liquid medium and connected with the valve member, the valve member being thereby subjected to substantially balanced pressure, a pump to force additional liquid medium into the expansible member to expand it and to opertae the valve member, and means for driving the pump from the fan motor.

JOHN E. WOODS.

References Cited in the file of this patent

UNITED STATES PATENTS

| Number | Name | Date |
|---|---|---|
| 2,012,067 | Mayo | Aug. 20, 1935 |
| 2,020,618 | Persons | Nov. 12, 1935 |
| 2,135,300 | Crago | Nov. 1, 1938 |
| 2,194,805 | Moore | Mar. 26, 1940 |
| 2,269,411 | Newton | Jan. 6, 1942 |